United States Patent
Levantovsky

(10) Patent No.: US 10,134,150 B2
(45) Date of Patent: Nov. 20, 2018

(54) DISPLAYING GRAPHICS IN MULTI-VIEW SCENES

(75) Inventor: Vladimir Levantovsky, North Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 12/853,859

(22) Filed: Aug. 10, 2010

(65) Prior Publication Data

US 2012/0038641 A1    Feb. 16, 2012

(51) Int. Cl.
  *G06T 7/593*  (2017.01)
  *H04N 13/183*  (2018.01)
  *H04N 13/156*  (2018.01)
  *H04N 13/00*  (2018.01)

(52) U.S. Cl.
  CPC ........... *G06T 7/593* (2017.01); *H04N 13/156* (2018.05); *H04N 13/183* (2018.05); *H04N 2013/0081* (2013.01)

(58) Field of Classification Search
  CPC ........ G06T 7/0075; H04N 5/85; H04N 5/445; H04N 9/8715; H04N 13/0003; H04N 13/0004; H04N 13/0018; H04N 13/0051; H04N 13/007; H04N 13/026; H04N 21/431; H04N 21/4348; H04N 21/44012; H04N 21/4884; H04N 2013/0081; H04N 13/003; H04N 13/004
  USPC ......... 345/419–427; 382/190–195, 285, 154; 348/42, 43, 51
  See application file for complete search history.

(56) References Cited

U.S. PATENT DOCUMENTS

| | | | |
|---|---|---|---|
| 6,347,152 B1* | 2/2002 | Shinagawa et al. | 382/195 |
| 6,353,457 B2* | 3/2002 | Uomori et al. | 348/47 |
| 6,411,326 B1 | 6/2002 | Tabata | |
| 6,504,569 B1* | 1/2003 | Jasinschi et al. | 348/43 |
| 6,549,650 B1* | 4/2003 | Ishikawa et al. | 382/154 |
| 6,807,295 B1 | 10/2004 | Ono | |
| 7,098,998 B2* | 8/2006 | Terauchi et al. | 356/3.14 |

(Continued)

FOREIGN PATENT DOCUMENTS

| | | |
|---|---|---|
| EP | 2194726 | 6/2010 |
| JP | H10-327432 | 12/1998 |

(Continued)

OTHER PUBLICATIONS

Mamta Juneja, Parvinder Singh Sandhu, Performance Evaluation of Edge Detection Techniques for Images in Spatial Domain 2009, International Journal of Computer Theory and Engineering, vol. 1(5):614-621.*

(Continued)

*Primary Examiner* — Michael J Cobb
(74) *Attorney, Agent, or Firm* — Fish & Richardson P.C.

(57) ABSTRACT

A computing device includes a memory for storing instructions and a processor. The processor is configured to execute the instructions to identify a location for a graphical element in a predefined three-dimensional scene using depth information of content included in two or more different two-dimensional representations of the predefined three-dimensional scene. The processor is also configured to produce two or more different two-dimensional representations of the predefined three-dimensional scene including the graphical element.

27 Claims, 7 Drawing Sheets

(56) References Cited

U.S. PATENT DOCUMENTS

| | | | |
|---|---|---|---|
| 8,391,627 B1* | 3/2013 | Worthington | 382/260 |
| 2001/0033327 A1 | 10/2001 | Uomori et al. | |
| 2002/0118275 A1* | 8/2002 | Harman | 348/51 |
| 2003/0025695 A1* | 2/2003 | Morphet | G06T 15/40 345/423 |
| 2005/0140676 A1 | 6/2005 | Cho | |
| 2005/0193206 A1* | 9/2005 | Kunisa | H04L 9/3247 713/176 |
| 2006/0215918 A1* | 9/2006 | Kimura | H04N 19/44 382/233 |
| 2007/0024614 A1* | 2/2007 | Tam et al. | 345/419 |
| 2007/0286500 A1* | 12/2007 | Akiyoshi et al. | 382/232 |
| 2007/0291030 A1* | 12/2007 | Fowler | G06T 15/405 345/422 |
| 2008/0198270 A1* | 8/2008 | Hobbs | H04N 19/44 348/708 |
| 2008/0205791 A1* | 8/2008 | Ideses et al. | 382/285 |
| 2008/0247670 A1* | 10/2008 | Tam et al. | 382/298 |
| 2008/0285799 A1* | 11/2008 | Chiu et al. | 382/103 |
| 2009/0041336 A1 | 2/2009 | Ku et al. | |
| 2009/0142041 A1* | 6/2009 | Nagasawa et al. | 386/124 |
| 2009/0284584 A1* | 11/2009 | Wakabayashi | H04N 13/0003 348/44 |
| 2010/0021141 A1* | 1/2010 | Yamashita et al. | 386/109 |
| 2010/0050082 A1* | 2/2010 | Katz | H04N 5/272 715/719 |
| 2010/0074594 A1* | 3/2010 | Nakamura | H04N 13/007 386/241 |
| 2010/0141757 A1 | 6/2010 | Baik et al. | |
| 2010/0188572 A1* | 7/2010 | Card, II | 348/468 |
| 2010/0220175 A1* | 9/2010 | Claydon et al. | 348/43 |
| 2010/0321389 A1* | 12/2010 | Gay | G06T 19/006 345/427 |
| 2011/0025830 A1* | 2/2011 | McNamer et al. | 348/50 |
| 2011/0242104 A1* | 10/2011 | Zhang et al. | 345/419 |
| 2012/0271848 A1* | 10/2012 | Kadowaki | G06F 17/30241 707/769 |
| 2018/0096502 A1* | 4/2018 | Kansara | G06T 11/60 |

FOREIGN PATENT DOCUMENTS

| | | |
|---|---|---|
| JP | 2001-016612 | 1/2001 |
| JP | 2005037378 | 2/2005 |
| JP | 2006325165 | 11/2006 |
| JP | 2007-037011 | 2/2007 |
| JP | 2009043221 | 2/2009 |
| JP | 2009135686 | 6/2009 |
| JP | 2010136371 | 6/2010 |
| JP | 2012510750 | 5/2012 |
| JP | 2012516505 | 7/2012 |
| WO | WO2010/010499 | 1/2010 |
| WO | WO2010/064118 | 6/2010 |
| WO | WO2010/088070 | 8/2010 |

OTHER PUBLICATIONS

Bryan Morse High-Pass and Band-Pass Filtering 2010, BYU Computer Science CS450 Introduction to Digital Signal and Image Processing Notes.*

Alex P. Pentland, A New Sense for Depth of Field, 1985, Proceedings of the Ninth International Joint Conferences on Artificial Intelligence, vol. 2, pp. 988-994.*

Alex P. Pentland, A New Sense for Depth of Field, 9(4):523-531 1987, IEEE Transactions on Pattern Analysis and Machine Intelligence, 9(4):523-531.*

Merriam-Webster, Merriam-Webster Dictionary—Periodically, 2016, retrieved from <http://www.merriam-webster.com/dictionary/periodically>, accessed Aug. 17, 2016.*

International Search Report & Written Opinion, PCT/US2011/046924, dated Mar. 26, 2012, 9 pages.

Supplementary European Search Report, EP Application No. EP11816873, dated Jul. 11, 2014, 6 pages.

Japanese Office Action, with English Translation, Application No. 2013-524146, dated Mar. 25, 2015, 8 pages.

Japanese Office Action, with English Translation, Application No. 2013-524146, dated Dec. 24, 2015, 10 pages.

* cited by examiner

DISPLAYING GRAPHICS IN MULTI-VIEW SCENES

BACKGROUND

This description relates to representing graphics such as images, text and user interfaces in multi-view scenes.

In the ever-expanding field of presenting three-dimensional (3D) imagery on two-dimensional screens, such as in movie theaters (e.g., IMAX 3D movie theaters) and broadcast programming (e.g., 3D television over digital terrestrial or cable systems), multiple images (e.g., stereoscopic images) of a scene are often produced for the human eye to perceive depth. For example, by simultaneously presenting images of left and right eye views, depth may be simulated by using various separation techniques such as color filters, polarizing filters, time-based shutters, etc. While such separation techniques provide depth perception, superimposing graphics and imagery not complying with the human perception of 3D scenes may degrade or even ruin the observer's viewing experience.

SUMMARY

The systems and techniques described here relate to determining locations for positioning graphical elements into previously defined three-dimensional scenes while preserving viewer depth perception.

In one aspect, a computer-implemented method includes identifying a location for a graphical element in a predefined three-dimensional scene using depth information of content included in two or more different two-dimensional representations of the predefined three-dimensional scene. The method also includes producing two or more different two-dimensional representations of the predefined three-dimensional scene including the graphical element.

Implementations may include any or all of the following features. The method may also include determining the depth information from the two or more different representations of the predefined three-dimensional scene. Determining the depth information may include filtering the two or more different two-dimensional representations of the predefined three-dimensional scene. Determining the depth information may also include comparing the filtered two or more different two-dimensional representations of the predefined three-dimensional scene. Filtering the two or more different two-dimensional representations may include identifying edges of content. Filtering may include high pass filtering to identify high spatial frequency features represented in the two or more different two-dimensional representations. The two or more different two-dimensional representations may represent different views of the predefined three-dimensional scene. Determining the depth information may include calculating the parallax between the two or more different two-dimensional representations. Producing the two different representations may include representing the graphical element with two or more different two-dimensional views. The graphical element may represent a geometrical object, a portion of a user interface, an image and text. The depth information may be determined from compressed video data.

In another aspect, a computing device includes a memory for storing instructions and a processor. The processor is configured to execute the instructions to identify a location for a graphical element in a predefined three-dimensional scene using depth information of content included in two or more different two-dimensional representations of the predefined three-dimensional scene. The processor is also configured to produce two or more different two-dimensional representations of the predefined three-dimensional scene including the graphical element.

Implementations may include any or all of the following features. The processor may be further configured to determine the depth information from the two or more different representations of the predefined three-dimensional scene. To determine the depth information, the processor may be configured to filter the two or more different two-dimensional representations of the predefined three-dimensional scene. Further, to determine the depth information, the processor may be configured to compare the filtered two or more different two-dimensional representations of the predefined three-dimensional scene. To filter the two or more different two-dimensional representations, the processor may be configured to identify edges of content. To filter, the processor may also be configured to high pass filter to identify high spatial frequency features represented in the two or more different two-dimensional representations. The two or more different two-dimensional representations may represent different views of the predefined three-dimensional scene. To determine the depth information, the processor may be configured to calculate the parallax between the two or more different two-dimensional representations. To produce the two different representations, the processor may be configured to represent the graphical element with two or more different two-dimensional views. The graphical element may represent at least one of a geometrical object, a portion of a user interface, an image and text. The depth information may be determined from compressed video data.

In still another aspect, one or more computer readable media storing instructions that are executable by a processing device, and upon such execution cause the processing device to perform operations that include identifying a location for a graphical element in a predefined three-dimensional scene using depth information of content included in two or more different two-dimensional representations of the predefined three-dimensional scene. The operations also include producing two or more different two-dimensional representations of the predefined three-dimensional scene including the graphical element.

Implementations may include any or all of the following features. The operations may also include determining the depth information from the two or more different representations of the predefined three-dimensional scene. Determining the depth information may include filtering the two or more different two-dimensional representations of the predefined three-dimensional scene. Determining the depth information may also include comparing the filtered two or more different two-dimensional representations of the predefined three-dimensional scene. Filtering the two or more different two-dimensional representations may include identifying edges of content. Filtering may include high pass filtering to identify high spatial frequency features represented in the two or more different two-dimensional representations. The two or more different two-dimensional representations may represent different views of the predefined three-dimensional scene. Determining the depth information may include calculating the parallax between the two or more different two-dimensional representations. Producing the two different representations may include representing the graphical element with two or more different two-dimensional views. The graphical element may represent a geometrical object, a portion of a user interface, an image and text. The depth information may be determined from compressed video data.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
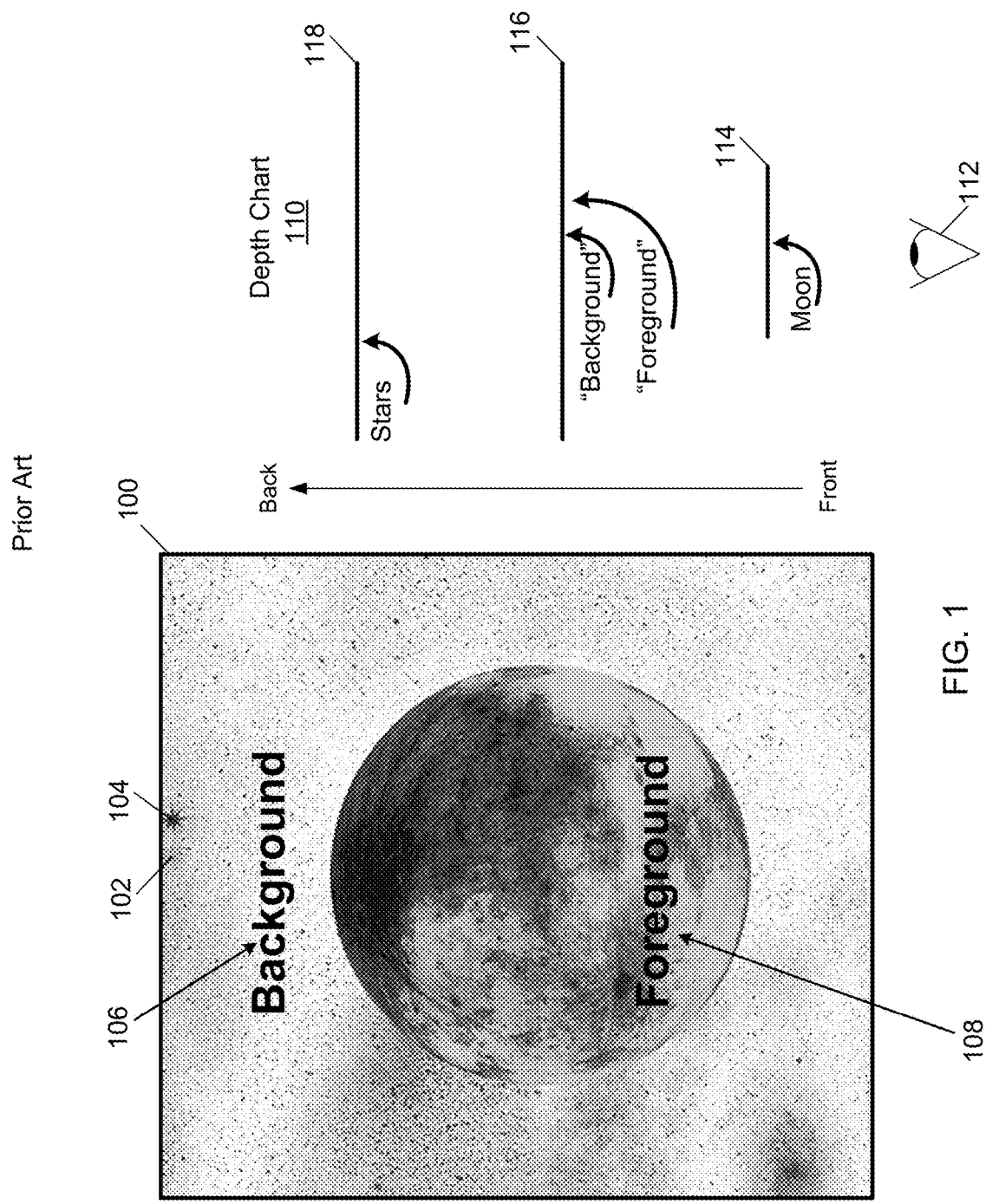
FIGS. 1 and 2 illustrate stereoscopic images of a three-dimensional scene.

Referring to FIG. 1, an exemplary two-dimensional (2D) stereoscopic image of a three-dimensional (3D) scene is presented. In particular, an image of the moon is illustrated in the foreground of a stereoscopic image 100 and a blanket of stars is represented in the background. To provide depth perception for the viewer (and simulate the 3D scene), the stereoscopic image 100 includes two different views of the scene (e.g., one view from a right eye perspective and another view from a left eye perspective). Typically the two views are superimposed onto a surface (e.g., a movie screen, piece of paper, computer display, etc.) and based upon the slight differences between the views, depth is perceived by the observer. In general, when viewing such multiple views of a 3D scene, the visual information observed by each eye is independently perceived and binocular vision is established to provide 3D depth perception for the viewer. In such stereoscopic images, techniques are used to separate the two views for reception by the appropriate eye of the observer. For example, color filters, polarizing filters (e.g., often used in movie theaters) and time-based shutters, to name a few, may be used for separating the two views such that the images received by the visual system of the observer differ for each eye and create an illusion of seeing the image in 3D space. In this illustration, left and right eye views of the starry background are noticeable by two representations 102, 104 of a particularly large star.

While these two views (e.g., that provide binocular vision) enable a substantially true 3D presentation, additional elements may need to be added to enhance the viewing experience. For example, additional graphical content (e.g., text, images, user interfaces etc.) may be incorporated into the scene to assist the viewer. Often such additional content is incorporated after the stereoscopic views for a natural 3D scene have been produced. Such post-production content additions may degrade the viewing experience, particularly if the added content is simply overlaid on previously defined stereoscopic views of a 3D scene. For example, a string of plain text rendered on a 3D television screen could have its depth perceived by a human observer as located exactly on the TV screen surface and may appear to be positioned behind another opaque object of the 3D scene, which may render the text unreadable and would disrupt the 3D perception of an observer. In general, when overlaying graphical content over previously defined 3D scenes, other factors such as linear perspective, relative object size and location, occlusion and motion parallax may effect depth as perceived by the human visual system and should be taken into account.

Some conventional 3D systems incorporate additional content into previously produced stereoscopic views of a 3D scene by almost always positioning the new content (e.g., text, images, user interfaces) at the foreground of the multi-view 3D image. As such, the observer may need to constantly shift the focal plane of his eyes between the foreground (where the text is located) and portions of the scene (provided by the stereoscopic views) at which the 3D content is perceived. Such focusing and refocusing can become particularly distracting and even cause eye fatigue (from strain on the viewer's eyes) that diminishes the quality of the 3D viewing experience.

In this illustrated example, two words 106, 108 (i.e., "Background" and "Foreground") are overlaid upon the views included in the stereoscopic image 100. Simply placed on the plane of the image, each of the words would not be perceived at a depth corresponding to related content included in the image 100. For example, based upon the two different views included in the stereoscopic image 100, the stars appear sunken into image while the moon appears to project forward out of the image. By overlaying the text, neither of the words 106, 108 appear to be located at the depth of the stars or the moon. To the right of the stereoscopic image 100, a depth chart 110 represents the perceived depths of the content included in the scene. From a viewer's perspective (represented with a symbolic eye 112), the moon is perceived as being on a plane 114 that is forward to a plane 116 that represents the plane upon which the views are projected (e.g., the plane of the page). Based upon the perceived depth provided by the stereoscopic image 100, another plane 118 defines the depth that the stars appear compared to the plane 114 of the moon. As such, the viewer perceives the moon as being located closer and the stars farther back. Since the words 106, 108 overlay the surface upon which the image is projected, they are not perceived at the depth of the moon (at plane 114) or the stars (at plane 110). As such, the viewer needs to adjust his eye to focus on the plane 116 to read either of the words, which can cause fatigue and degrade the viewing experience. Further, due to its location, the word 108 may appear as being obscured by the representation of the moon. So, along with positioning the text at a location that may cause focusing issues for the viewer, the additional textual content may break the 3D viewing experience of a human observer and may not be clearly legible in the stereoscopic image.

To reduce the distracting effects and potential viewer eye fatigue, one or more techniques may be implemented to determine the location and depth of graphical elements being introduced in a previously defined stereoscopic image of a 3D scene. For example, text (e.g., a label, closed caption text, etc.) may be processed such that the text is perceived at a depth that is approximately equivalent to corresponding objects already represented in the stereoscopic image. Referring to the scene illustrated in FIG. 1, the words 106, 108 may be processed such that they are positioned to be perceived at equivalent depths of the associated graphics (e.g., the word "Background" 106 may be positioned at the plane 118 of the stars and the word "Foreground" 106 may be perceived at the depth of the plan 114 at which the moon is perceived).

Figure 2:
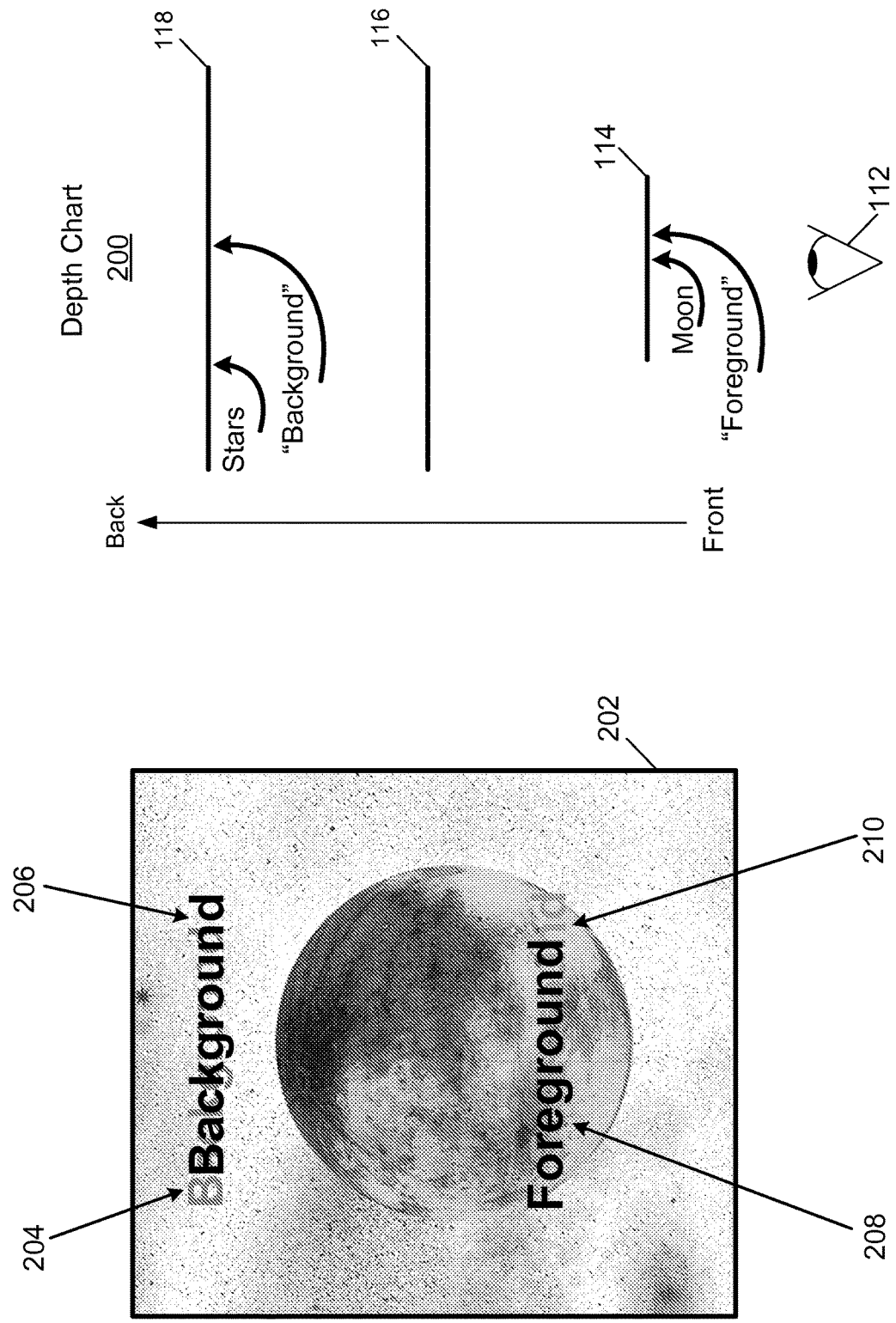

Referring to FIG. 2, the introduced text (e.g., the words 106, 108 shown in FIG. 1) is processed to respectively position each word at a perceived depth that is equivalent with an associated graphic. In this particular example, the word "background" is positioned at the depth of the plane 118 at which stars are perceived by the viewer 112 (as represented in a depth chart 200). In a similar manner, the word "foreground" is positioned at the depth of the plane 114 that represents the perceived depth of the graphic of the moon. As such, the viewer 112 does not need to substantially adjust his eyes to focus upon the text and the associated image at the perceived depth. Along with providing a more pleasant viewing experience, eye strain may be reduced along with visual distractions.

One or more techniques may be implemented to position such graphical elements (e.g., the words "background" and "foreground") at perceived depths associated with a previously defined stereoscopic image of a 3D scene. For example, left and right eye perspective views for each word may be produced and appropriately positioned on the stereoscopic image of the 3D scene. In this particular example, a stereoscopic image 202 of the 3D scene includes left and right eye perspective graphical representations 204, 206 of the word "Background" that are positioned for being perceived at the appropriate depth (e.g., represented with plane 118) of the starry sky. Similarly, graphical representations 208, 210 are produced and positioned in the stereoscopic image 200 such that the word "Foreground" is perceived by the viewer 112 as being at a depth (e.g., represented with the plane 114) equivalent to the graphic of the moon. To position such graphical elements within such a stereoscopic image, depth information associated with the 3D scene is needed. One or more techniques may be used for determining such information from multi-view data (representing the left and right eye views of a scene). For example, the apparent displacement or difference between the stereoscopic views, often referred to as parallax, may be determined to provide depth information. Prior to calculating depth information from the parallax between the views, the multiple views may need to be processed to identify their respective focal planes. For example, sharply focused portions of an image (e.g., high spatial frequency components or edges) may be identified using one or more techniques (e.g., high pass filters, analyzing discrete cosine transforms (DCT) coefficients of compressed imagery). Such depth information may also be determined during production of stereoscopic images and may be provided with the content (e.g., video) such that additional processing by the receiver may not be needed.

Figure 3:
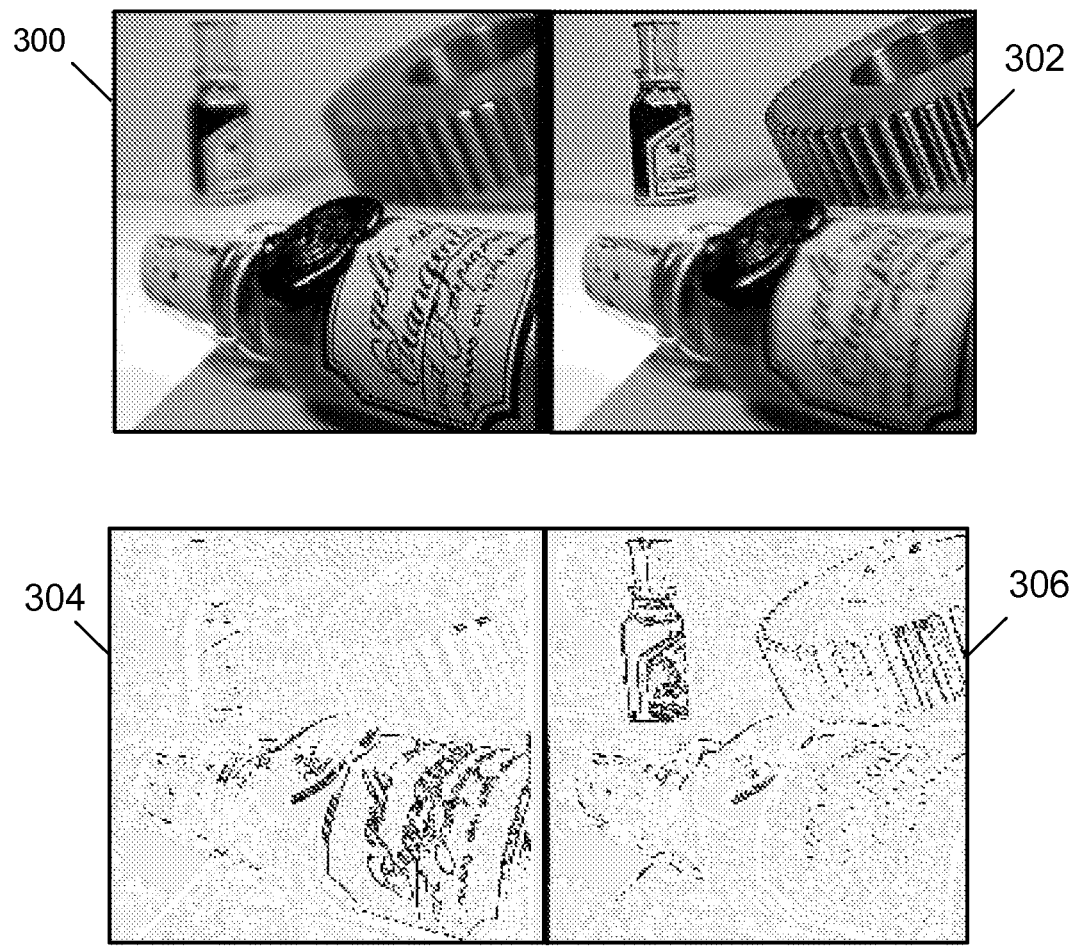
FIG. 3 illustrates processing of images to identify focal planes.

Referring to FIG. 3, prior to determining the difference between stereoscopic views (e.g., a left eye view and a right eye view) of a 3D scene, the focal planes of the views may be identified through one or more processing techniques. Similar to the human eye, which has a relatively shallow depth of field and may generally only focus on one area (or a focal plane) at a particular time instance, a camera lens adjusted for a wide aperture may cause one particular area of a scene to appear sharp and in focus while the remaining parts of the scene will be blurred. This technique is often and deliberately used in films and photography to capture a viewer's attention on a particular subject in the image frame. By determining the focal plane of different elements in each of a pair of multi-view images (such as left and right eye views provided by a stereoscopic image) appropriate content may be identified for calculating parallax. For example, image 300 presents a picture of three objects with one object (a horizontally positioned bottle) in the foreground that is in focus. Quite differently, an image 302 contains equivalent content, however the focal plane has shifted to the background of the image. For example, the horizontally positioned bottle (in the foreground) appears blurred and the vertically positioned bottle and gear (in the background) appear to be in focus.

To appropriately identify content being focused upon (and in the focal plane), one or more processing techniques may be implemented. For example, an image may be filtered and evaluated in one or more domains (e.g., the spatial domain, frequency domain, etc.) to reveal detail of image portions (e.g., sharp transitions such as object edges) that are in the focal plane. In the illustrated example, a filter (e.g., a high pass filter) is applied to the images 300, 302 to respectively produce filtered images 304, 306. By applying the filter, portions of the images containing relatively high spatial frequency content are detected and included in the corresponding filtered image. As such, the edges of objects in focus are mapped into the filtered images. Filtered image 304, which has a gradient applied by a filter for visualization, predominately presents the edges of the horizontally positioned bottle in the foreground of the image. Similarly, filtered image 306, which is also processed by an equivalent type of filter, predominately presents edges of the objects in focus from the image (e.g., the vertically positioned bottle and the gear).

While filtering techniques such as high pass filtering may be used to attain the spatial frequency information, other techniques may also be implemented. For example, spatial information can be obtained by evaluating compressed image data. Processed data by applying compression techniques such as those used by the Joint Photographic Experts Group (JPEG) standard, high definition video encoding (e.g., H.264/MPEG-4 AVC standards) etc. may be used as a source of spatial frequency information. Such lossy compression schemes generally convert images from the spatial to the frequency domain for determining the amount of image content that may be eliminated without significantly degrading image quality. Compressed, the image data is encoded and stored in the frequency domain. As such, the stored data may be retrieved to analyze and identify spatial frequency information without needing to apply one or more filters or other types of filtering operations.

Similar to the images 300, 302 processed in the figure, the multiple views of a stereoscopic image may be processed to determine objects in focus (e.g., with sharp transitions such as edges) and the corresponding focal plane of the views. From these processed views, the apparent displacement (e.g., parallax) of one or more objects included in views can be estimated. For example, the left and right eye views of a stereoscopic image may each be independently processed (e.g., high passed filtered) to identify the locations of edges of objects in focus included in the views. By simultaneously comparing the two filtered views, parallax values may be estimated by evaluating the displacement of corresponding edges of equivalent objects to produce depth information associated with the stereoscopic image. From the depth information, the appropriate location for positioning a graphical element (e.g., text, image, user interface, etc.) on a focal plane may be determined. Additionally, the relative depth of field of the focal plane may be determined.

Figure 4:
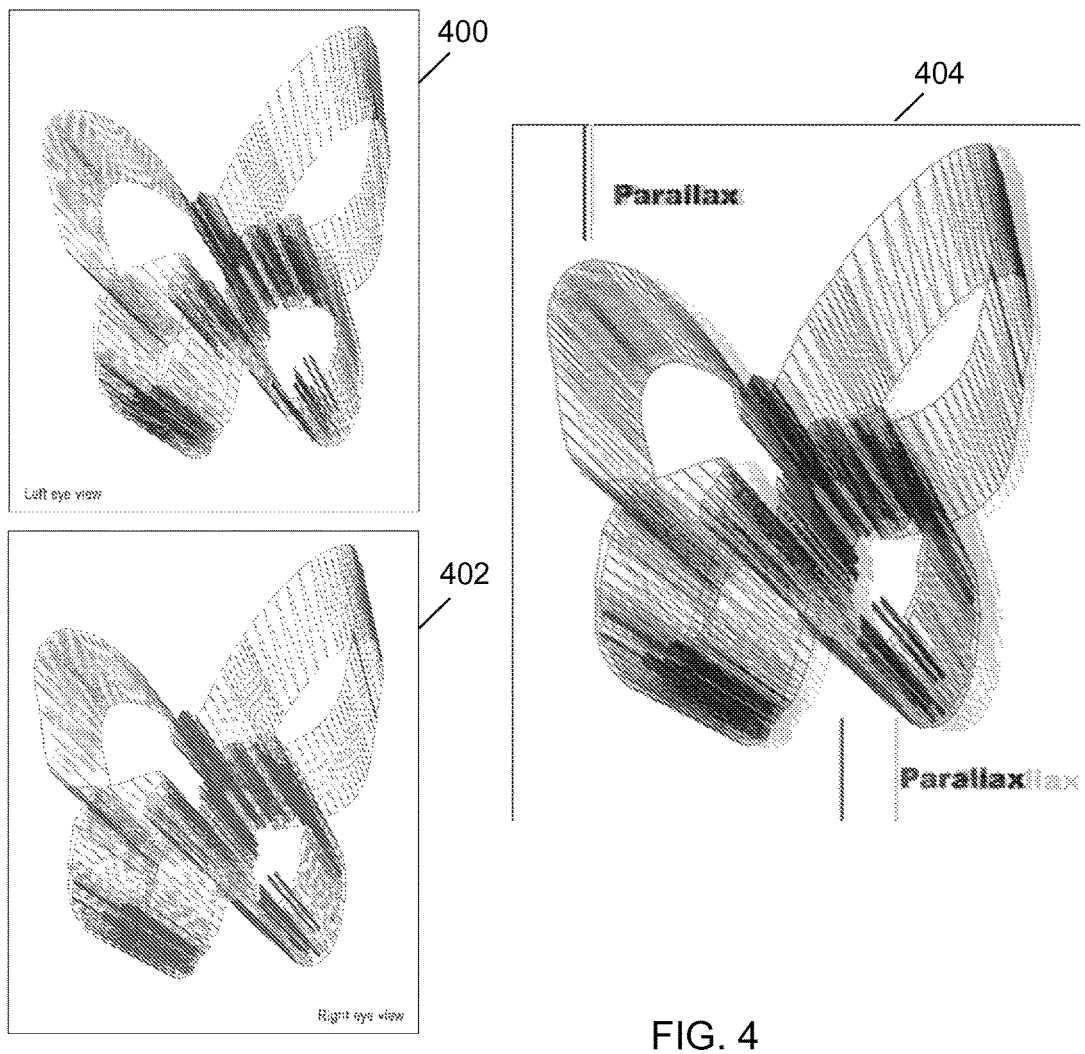
FIG. 4 illustrates spatial differences between two views of a three-dimensional scene.

Referring to FIG. 4, two images are presented that each represent a wire-framed object from two views. In particular, an image 400 illustrates the view of the wire-framed object as perceived from a left eye view while another image 402 provides the view of the object as perceived from an observer's right eye. Due to the nature of the wire-frame representation, each image could be considered as a filtered version (e.g., high pass filtered) of a corresponding view of a stereoscopic image. The views provided by each of the images 400, 402 appear similar, however by comparing the images, spatial differences are present that correspond to parallax of the images. By evaluating the parallax between equivalent portions of the wire-framed object, depth information may be produced. Subsequently, the depth information can be used for determining the location and depth for rendering a graphical element (e.g., text, image, user interface, etc.) in a stereoscopic image that includes the views. To illustrate the parallax between the views provided by images 400, 402, the representations of the wire-framed object from each view are superimposed in an image 404. One of various types of separation techniques such as color separation may be implemented for perceiving the wire-frame object in 3D. Similar results may be achieved by implementing other techniques for separating views such as by assigning polarizations to the superimposed views and using polarized glasses, or by displaying left and right eye views in a repetitive sequence, synchronized with time-based shutter glasses.

The superimposed views of the wire-framed object demonstrate the spatial differences of equivalent portions of the object. Further, the superimposed views illustrate the variance in parallax values over the different portions of the object. For example, relatively large spatial differences are present in the lower right portion of the superimposed objects (that corresponds to the portion of the image perceived as being close to a human observer) compared to the upper left portion of the superimposed objects (where portions of the image appear to be positioned proximate to the background). From these spatial differences depth information (e.g., a map) may be produced, for example, by comparing the equivalent portions of the wire-framed object. Once quantified, the depth information may be used for determining the appropriate location and depth for positioning graphical elements (e.g., text, images, user interfaces, etc.). By allowing such positioning, graphical elements may be placed in the focal planes associated with previously produced stereoscopic images of 3D scenes, and thereby reduce the number of instances that an observer would need to refocus between the original content of the stereoscopic image and the newly incorporated graphical elements. Also, such information regarding the composition of the 3D imagery allows graphical elements to be positioned so as not be occluded by objects included in the scene and preserve the depth perception between portions of the image, thereby improving the 3D viewing experience for the observer.

One or more techniques may be implemented for quantifying spatial differences to produce depth information. Parallax values may be determined, for example, by scanning the left and right eye views and measuring the distances from an initial scan position to the edge of an object in the focal plane. Points that converge on the screen surface have parallax values of zero (e.g., corresponding points in the left and right eye views are located at equivalent locations) while non-zero parallax values (i.e., positive and negative) define portions of the image that appear as being positioned forward or behind the screen surface.

Figure 5:
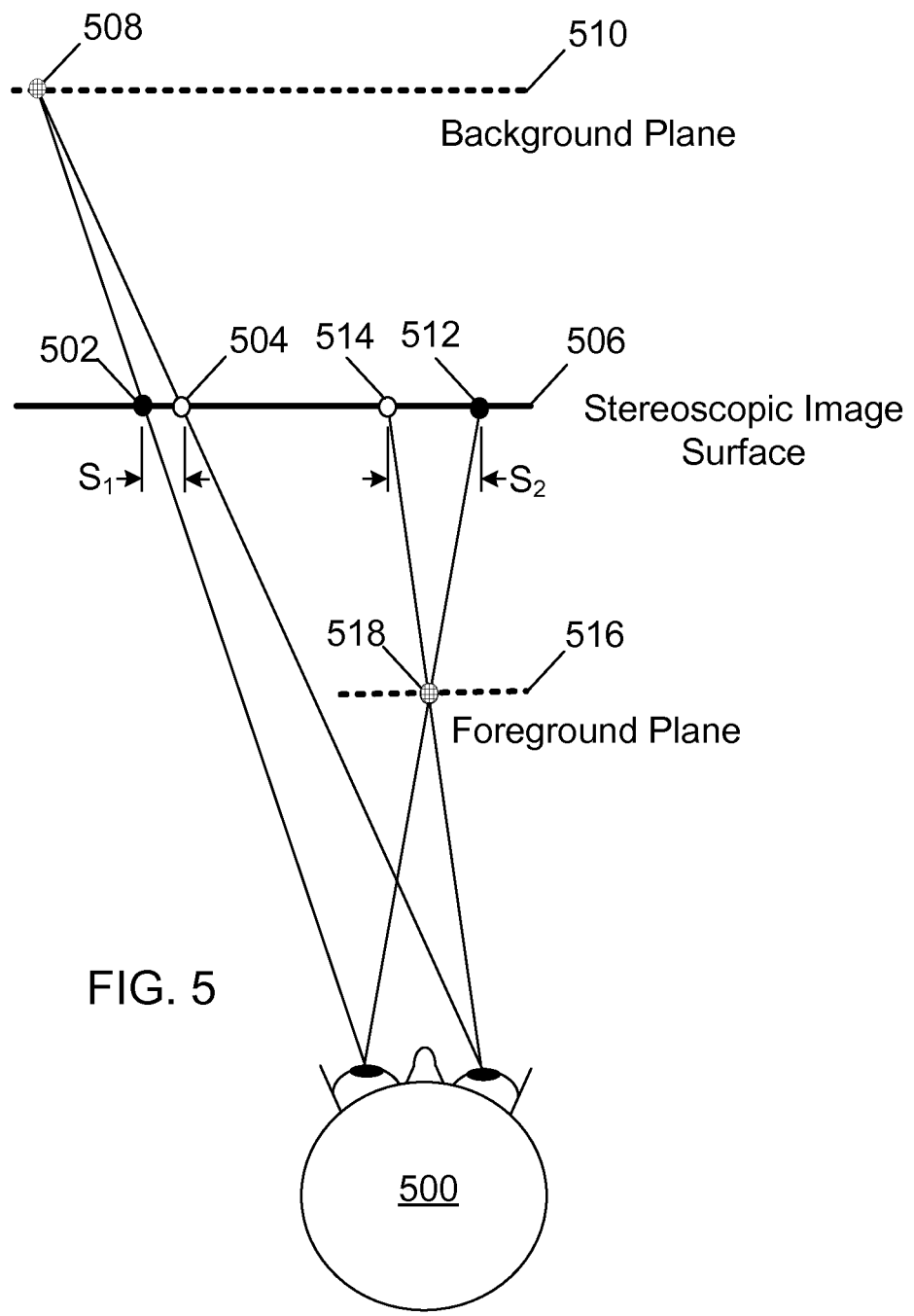
FIG. 5 illustrates positioning views in a stereoscopic image to provide depth perception.

Referring to FIG. 5, positioning of exemplary graphical elements is illustrated such that the elements appear at different focal planes of a stereoscopic image. In this example, a pair of images that represent views of a graphical element is overlaid onto a stereoscopic image of a previously defined 3D scene. Included in the pair is an image that represents the left eye view of the graphical element and another image that represents the right eye view of the element. Based upon the locations that the images are positioned and the separation technique implemented (e.g., color filters, polarizing filters, time-based shutters, etc.), the graphical element may be perceived at a particular depth by an observer 500. For example, a left eye view of graphical element (represented by a solid black circle 502) and a right eye view of the graphical element (represented by a solid white circle 504) are overlaid upon a surface 506 that includes a previously produced stereoscopic image. In this example, based upon the positions of the views 502, 504 (represented by a distance $S_1$) and one of the available separation technique, the graphical element (as represented with a hashed circle 508) is generally perceived at the depth of a background plane 510. As such, the graphical element (e.g., the word "Background") is perceived as being located at an equivalent focal plane of other graphical elements (e.g., a stereoscopic image of a starry sky of FIG. 1) located at the background plane 510, thereby significantly reducing the amount of refocusing needed to view the graphical element and the content of the previously defined stereoscopic image.

In a similar manner, a pair of images may be overlaid upon the surface 506 such that a graphical element represented by the images is perceived by the observer 500 at a depth in the foreground. For example, by transposing left and right eye views (compared to the views 502 and 504), the graphical element represented by the views may appear to be in the foreground. In the illustrated example, the positions of a left eye view of a graphical element (as represented by a solid black circle 512) and a right eye view of the graphical element (as represented by a solid white circle 514) are inverted and positioned on the surface (as represented by a distance $S_2$). Based upon the positions of the views 512, 514 and the separation technique implemented, the graphic element can be stereoscopically perceived at a depth of a foreground plane 516 (as represented with a hashed circle 518). As such, the graphical element (e.g., the word "Foreground") can be perceived at a focal plane shared by previously produced graphical elements (e.g., a stereoscopic image of the moon). Therefore, the observer 500 is provided a clear view of the graphical element and the portion of the previously defined 3D scene that is perceived at the foreground plane 516, reducing the need to refocus his eyes while observing a composite 3D scene. The illustrated example demonstrates that positioning views allows a graphical element to be inserted into a previously produced stereoscopic image of a 3D scene. Further by controlling the position of the views, the graphical element may be located so as not to be occluded by content of the previously defined stereoscopic image.

Figure 6:
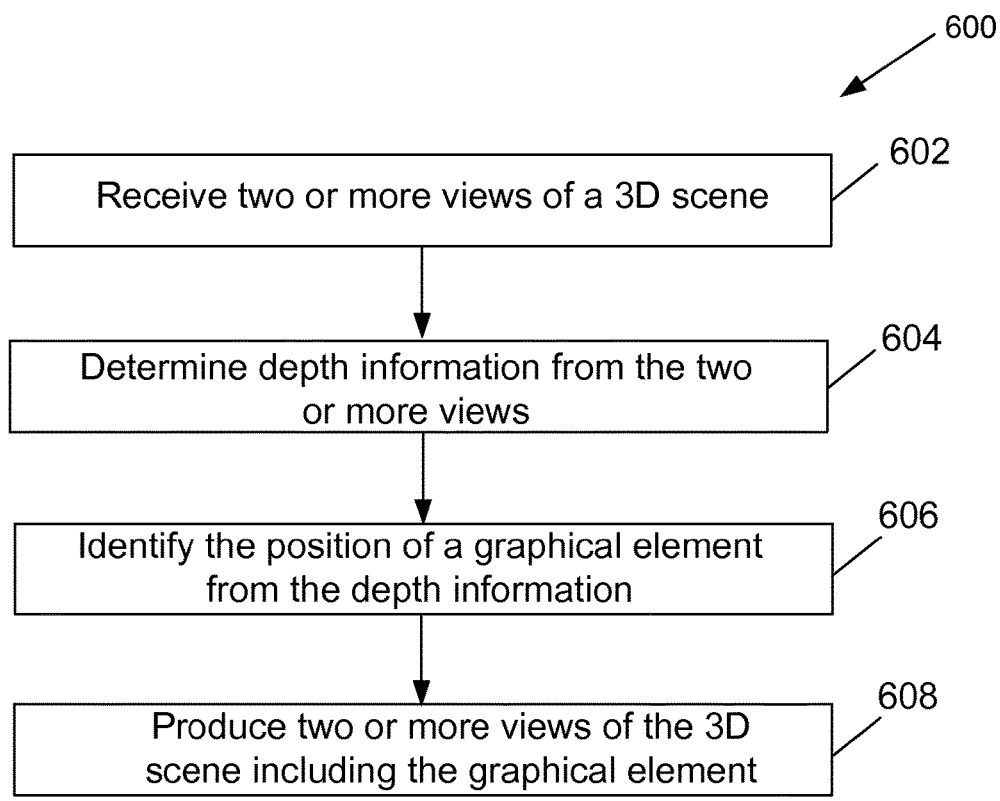
FIG. 6 is an example flow chart of operations for positioning a graphical element in a stereoscopic image.

Referring to FIG. 6, a flowchart 600 represents operations of a computing device such as a computer system for including one or more graphical elements (e.g., text, images, user interfaces, etc.) in a previously defined stereoscopic image of a 3D scene. Such operations are typically executed by a single computing device, however, the execution of the operations may be executed by multiple computing devices. Along with being executed at a single site (e.g., at the location of a computing device), operation execution may be distributed among two or more locations.

Operations of the computing device may include receiving 602 two or more views of a previously defined 3D scene (e.g., a stereoscopic image). For example, a left eye view and a right eye view of a 3D scene may be received.

Operations may also include determining 604 depth information from the two or more views. For example, each of the views may be processed (e.g., filtered) to identify the edges of objects (or other content) included in the views. Spatial differences such as parallax between the multiple images may be determined by comparing the positions of corresponding edges represented in the processed views. From the depth information a focal plane of the views may be identified along with other information such as the location of the focal plane in 3D space. By using the depth information, operations may also include identifying 606 the position for including a graphical element within the 3D scene. For example, the depth information may be used to determine the location (e.g., two dimensional coordinates) and size of stereoscopic views of the graphical element to be perceived by an observer relative to the focal plane. Once the position information (e.g., location, size, etc.) has been determined for the graphical element, operations may include producing 608 two or more views of the 3D scene (e.g., a stereoscopic image) that includes the graphical element. For example, a left eye view and a right eye view may be rendered that each includes the graphical element such that when viewed by an observer, the element is appropriately perceived in 3D space.

Figure 7:
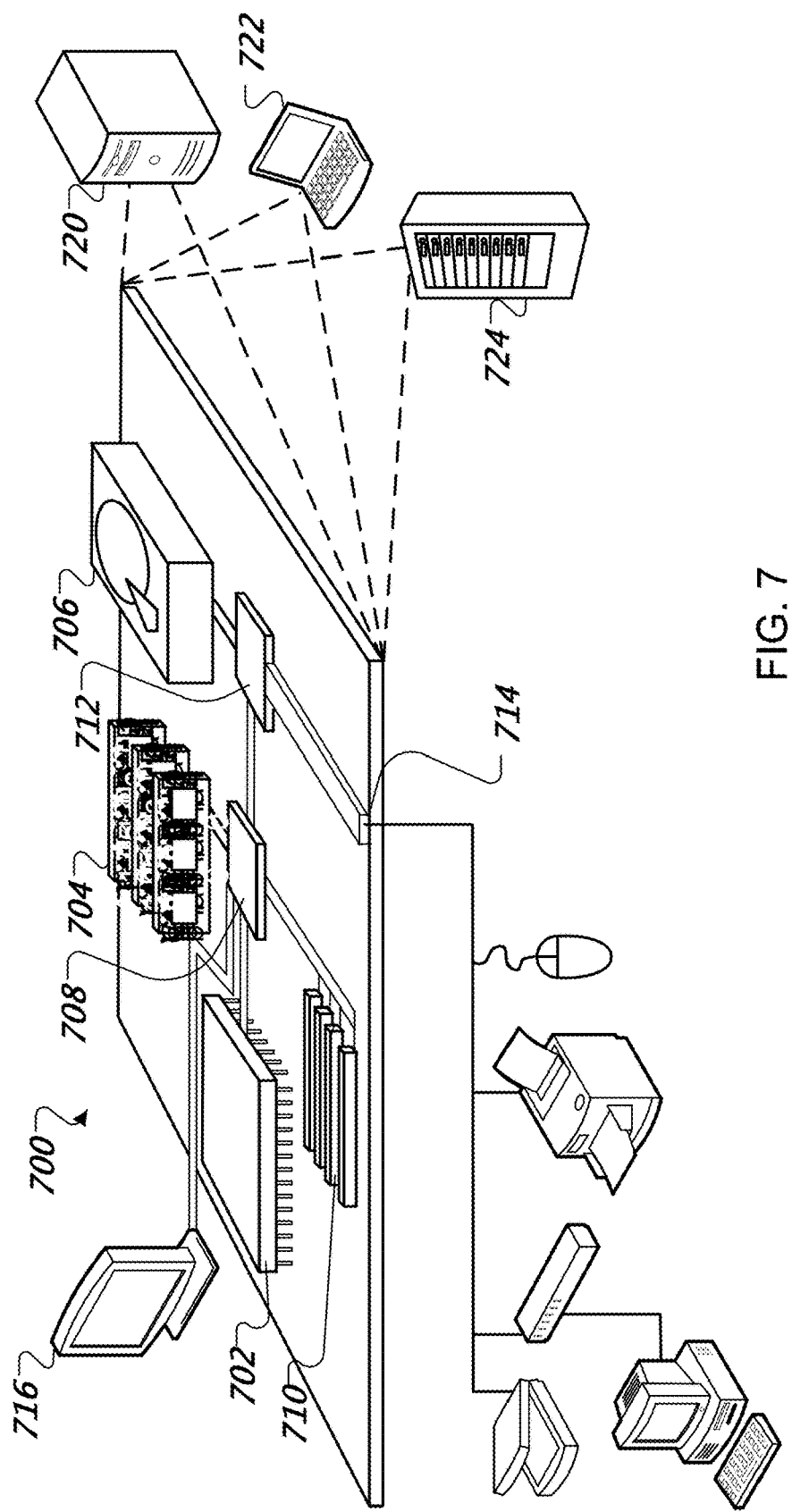
FIG. 7 is a block diagram of computing devices and systems.

FIG. 7 is a block diagram of computing devices that may be used and implemented to perform operations associated with incorporating views of a graphical element into a previously defined stereoscopic image of a 3D scene. Computing device 700 is intended to represent various forms of digital computers, image processing devices and similar type device, such as digital TV sets, set-top boxes and receivers (e.g., cable, terrestrial, Internet Protocol television (IPTV), etc.), laptops, desktops, workstations, personal digital assistants, mobile devices such as cellular telephones, servers, blade servers, mainframes, and other appropriate computers.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or the like.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which can accept various expansion cards (not shown). In the implementation, low-speed controller 712 is coupled to storage device 706 and low-speed expansion port 714. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    identifying, by a processor, a focal plane associated with a predefined three-dimensional scene from a set of two or more different two-dimensional representations of the predefined three dimensional scene, each respective representation in the set of the two or more different two-dimensional representations having a different perspective of view of the predefined three-dimensional scene, wherein the focal plane is identified by high spatial frequency components of a portion of an object represented in each of the different two or more two-dimensional representations;
    determining, by the processor, a depth of the focal plane for positioning a graphical element in the predefined three-dimensional scene based on the portion of the object used to identify the focal plane, identified by high spatial frequency components, and being represented in the set of two or more different two-dimensional representations,
    wherein determining the depth of the focal plane for positioning the graphical element comprises:
        determining parallax between corresponding high spatial frequency components of the portion of the object used to identify the focal plane and present in each representation in the set of two or more different two-dimensional representations,
        determining depth information using the parallax of the set of two or more representations in which each representation has a different perspective of view of the predefined three-dimensional scene,
        identifying other objects in the predefined three-dimensional scene, and
        superimposing the graphical element in the focal plane of the scene based on the determined depth information of the portion of the object used to identify the focal plane to preserve depth perception, wherein superimposing includes determining a position for each of two or more perspective views of the graphical element in a corresponding two-dimensional representation of the predefined three-dimensional scene such that the graphical element is placed in the focal plane and is absent occlusion by the portion of the object and the other objects in the predefined three-dimensional scene; and producing a modified set of two or more two-dimensional representations of the predefined three-dimensional scene, wherein each two-dimensional representation in the modified set includes a perspective view of the superimposed graphical element absent occlusion from the objects included in the three-dimensional scene, and the individual two-dimensional representations in the modified set are configured such that the graphical element appears in the focal plane.

2. The computer-implemented method of claim 1 in which determining the depth information includes comparing the high spatial frequency components of the two or more different two-dimensional representations of the predefined three-dimensional scene.

3. The computer-implemented method of claim 1 in which the high spatial frequency components include edges of content.

4. The computer-implemented method of claim 1 in which the high spatial frequency components are detected by high pass filtering.

5. The computer-implemented method of claim 1 in which producing the modified set of two or more two-dimensional representations includes representing the graphical element with two or more different two-dimensional views.

6. The computer-implemented method of claim 1 in which the graphical element represents at least one of a geometrical object, a portion of a user interface, an image and text.

7. The computer-implemented method of claim 1 in which the depth information is determined from compressed video data.

8. The computer-implemented method of claim 1, the set of two or more different two-dimensional representations of the predefined three dimensional scene being represented in a frequency domain.

9. The computer-implemented method of claim 1, the set of two or more different two-dimensional representations of the predefined three dimensional scene being compressed.

10. A computing device comprising:
a memory for storing instructions; and
a processor configured to execute the instructions to:
identify a focal plane associated with a predefined three-dimensional scene from a set of two or more different two-dimensional representations of the predefined three dimensional scene, each respective representation in the set of the two or more different two-dimensional representations having a different perspective of view of the predefined three-dimensional scene, wherein the focal plane is identified by high spatial frequency components of a portion of an object represented in each of the two or more two-dimensional representations;
determine a depth of the focal plane for positioning a graphical element in the predefined three-dimensional scene based on the portion of the object used to identify the focal plane, identified by high spatial frequency components, and being represented in the set of two or more different two-dimensional representations, wherein determining the depth of the focal plane for positioning the graphical element comprises:
determining parallax between corresponding high spatial frequency components of the portion of the object used to identify the focal plane and present in each representation in the set of two or more two-dimensional representations,
determining depth information using the parallax of the set of two or more representations in which each representation has a different perspective of view of the predefined three-dimensional scene,
identifying other objects in the predefined three-dimensional scene, and
superimposing the graphical element in the focal plane of the scene based on the determined depth information of the portion of the object used to identify the focal plane to preserve depth perception, wherein superimposing includes determining a position for each of two or more perspective views of the graphical element in a corresponding two-dimensional representation of the predefined three-dimensional scene such that the graphical element is placed in the focal plane and is absent occlusion by the portion of the object and the other objects in the predefined three-dimensional scene; and produce a modified set of two or more two-dimensional representations of the predefined three-dimensional scene, wherein each two-dimensional representation in the modified set includes a perspective view of the superimposed graphical element absent occlusion from the objects included in the three-dimensional scene, and the individual two-dimensional representations in the modified set are configured such that the graphical element appears in the focal plane.

11. The computing device of claim 10, in which to determine the depth information, the processor is configured to compare the high spatial frequency components of the two or more different two-dimensional representations of the predefined three-dimensional scene.

12. The computing device of claim 10, in which the high spatial frequency components include edges of content.

13. The computing device of claim 10, in which the processor is configured to high pass filter to detect the high spatial frequency components.

14. The computing device of claim 10, in which producing the modified set of two or more two-dimensional representations includes representing the graphical element with two or more different two-dimensional views.

15. The computing device of claim 10, in which the graphical element represents at least one of a geometrical object, a portion of a user interface, an image and text.

16. The computing device of claim 10, in which the depth information is determined from compressed video data.

17. The computing device of claim 10, the set of two or more different two-dimensional representations of the predefined three dimensional scene being represented in a frequency domain.

18. The computing device of claim 10, the set of two or more different two-dimensional representations of the predefined three dimensional scene being compressed.

19. One or more non-transitory computer readable media storing instructions that are executable by a processing device, and upon such execution cause the processing device to perform operations comprising:
identifying, by a processor, a focal plane associated with a predefined three-dimensional scene from a set of two or more different two-dimensional representations of the predefined three dimensional scene, each respective representation in the set of the two or more different two-dimensional representations having a different perspective of view of the predefined three-dimensional scene, wherein the focal plane is identified by high spatial frequency components of a portion of an object represented in each of the two or more two-dimensional representations;

determining depth of the focal plane for positioning a graphical element in the predefined three-dimensional scene based on the portion of the object used to identify the focal plane, identified by high spatial frequency components, and being represented in the set of two or more different two-dimensional representations, wherein determining the depth of the of the focal plane for positioning the graphical element comprises:

determining parallax between corresponding high spatial frequency components of the portion of the object used to identify the focal plane and present in each representation in the set of two or more two-dimensional representations, determining depth information using the parallax of the set of two or more representations in which each representation has a different perspective of view of the predefined three-dimensional scene, identifying other objects in the predefined three-dimensional scene, and superimposing the graphical element in the focal plane of the scene based on the determined depth information of the portion of the object used to identify the focal plane to preserve depth perception, wherein superimposing includes determining a position for each of two or more perspective views of the graphical element in a corresponding two-dimensional representation of the predefined three-dimensional scene such that the graphical element is placed in the focal plane and is absent occlusion by the portion of the object and the other objects in the predefined three-dimensional scene; and producing a modified set of two or more two-dimensional representations of the predefined three-dimensional scene, wherein each two-dimensional representation in the modified set includes a perspective view of the superimposed graphical element absent occlusion from the objects included in the three-dimensional scene, and the individual two-dimensional representations in the modified set are configured such that the graphical element appears in the focal plane.

20. The computer readable media of claim 19, in which determining the depth information includes comparing the high spatial frequency components of the two or more different two-dimensional representations of the predefined three-dimensional scene.

21. The computer readable media of claim 19, in which the high spatial frequency components include edges of content.

22. The computer readable media of claim 19, in which the high spatial frequency components are detected by high pass filtering.

23. The computer readable media of claim 19, in which producing the modified set of two or more two-dimensional representations includes representing the graphical element with two or more different two-dimensional views.

24. The computer readable media of claim 19, in which the graphical element represents at least one of a geometrical object, a portion of a user interface, an image and text.

25. The computer readable media of claim 19, in which the depth information is determined from compressed video data.

26. The computer readable media of claim 19, the set of two or more different two-dimensional representations of the predefined three dimensional scene being represented in a frequency domain.

27. The computer readable media of claim 19, the set of two or more different two-dimensional representations of the predefined three dimensional scene being compressed.

\* \* \* \* \*